United States Patent
Cady

(10) Patent No.: US 11,802,451 B2
(45) Date of Patent: *Oct. 31, 2023

(54) SCREEN BREAK DETECTOR

(71) Applicant: Schlumberger Technology Corporation, Sugar Land, TX (US)

(72) Inventor: Eric Cady, Walton, KY (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,345

(22) Filed: Sep. 19, 2022

(65) Prior Publication Data
US 2023/0010268 A1 Jan. 12, 2023

Related U.S. Application Data

(63) Continuation of application No. 16/449,426, filed on Jun. 23, 2019, now Pat. No. 11,448,023.

(51) Int. Cl.
*E21B 21/06* (2006.01)
*E21B 47/00* (2012.01)
*B07B 1/46* (2006.01)
*G01F 23/14* (2006.01)

(52) U.S. Cl.
CPC ............ *E21B 21/065* (2013.01); *E21B 47/00* (2013.01); *B07B 1/4627* (2013.01); *E21B 21/06* (2013.01); *G01F 23/14* (2013.01)

(58) Field of Classification Search
CPC ..... B01D 2201/00; B07B 1/462; E21B 21/06; G01F 23/14
See application file for complete search history.

(56) References Cited

U.S. PATENT DOCUMENTS 8,256,309 B2 * 9/2012 Bowen .................... B07B 13/18
73/865.9

* cited by examiner

*Primary Examiner* — Robert E Fuller
*Assistant Examiner* — Lamia Quaim
(74) *Attorney, Agent, or Firm* — Jeffrey D. Frantz

(57) ABSTRACT

A method for determining a screen break may include obtaining a fluid stream after a screening system in a drilling process; placing the fluid stream into a screen break detector; obtaining a pressure within a well of the screen break detector when the screening system is in a first state; obtaining a pressure within the well of the screen break detector when the screening system is in a second state; determining a differential pressure within the well of the screen break detector obtained when the screening system is in the second state compared to the pressure when the screen break is in the first state; and transmitting a notification to an operator when the pressure within the screen break detector obtained when the screening system is in the second state is greater than the pressure within the screen break detector when the screening system is in the first state.

18 Claims, 5 Drawing Sheets

SCREEN BREAK DETECTOR

BACKGROUND

Screening technology is used to separate solids from liquids in many industries. In one industry, namely oil field services, screens are used to separate cuttings and other solids developed in a downhole environment from drilling fluids. Oil field services can be very expensive for oil field owners, and as such, a premium is placed on reliability of equipment and safety of workers.

Conventional screening technology uses a shaker with installed screens. A flow of solids and fluids developed in the downhole environment is pumped into the shaker, and the flow is placed on screens. The screens provide a sifting of the solids and fluids such that particles over the mesh size of the screen are caught on the mesh, while the remaining materials pass through the screen.

Processing flows from the downhole environment can occur continually as drilling proceeds. Breakdowns in screening, such as a faulty shaker or broken screen, can potentially let oversized particles pass which may detrimentally impact other drilling components, such as pumps, fluid treatment arrangements, and drills. According to the type of drilling environment, some screens may wear more quickly than the original estimation of service life. For example, when a screen breaks, a shaker must be stopped and the screen replaced. The stopping of the shaker may lead to termination of drilling, economically impacting the full operation.

The shakers themselves can accelerate the screens and fluids being processed to 7.5 g or more. These shakers often use an elliptical motion to impart energy into the fluid for separation to occur. In other examples, decks that carry the screens may be flat or inclined; which can add potential stress upon the screen; and shakers may have multiple screen decks, such as dual or triple deck designs. The respective mounting and accelerations impact the amount of degradation that a specific screen may receive. Thus, there is a need to provide an apparatus to monitor for a broken screen in oil field service work.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one embodiment, a method of determining a screen break is disclosed. The method may include obtaining a fluid stream from a screening system in a drilling process, wherein the screening system has at least one screen with a first mesh size. The method may also include placing the fluid stream into a screen break detector, wherein the screen break detector is configured with a sample screen with a coarser mesh than the at least one screen with the first mesh size. The method may further include obtaining a pressure within the screen break detector during a period when the screening system is in a first state. The method may also include obtaining a pressure within the screen break detector during a period when the screening system is in a second state. The method may further include determining a differential pressure in the screen break detector obtained during the period when the screening system is in the second state compared to the pressure when the screen break detector is at during the period when the screening system is in the first state. The method may also include transmitting a notification to an operator when the differential pressure in the screen break detector obtained during the period when the screening system is in the second state is greater than the pressure in the screen break detector during the period when the screening system is in the first state.

In another embodiment, a screen break detector may include a well, a sample fluid line, a sample screen, a pressure detector, and a removal line. The well may be configured to accept a fluid from a shaker. The sample fluid line may be configured to transport the fluid from a sample point to the well. The sample screen may include a mesh and may be configured to process the fluid from the shaker. The pressure detector may be configured to obtain a fluid pressure within the well from the fluid from the sample fluid line. The removal line may be connected to the well and configured to remove the fluid from the well.

In another embodiment, a screen break detection system may include a well, a sample fluid line, a sample screen, a pressure detector, a removal line, and a computing system. The well may be configured to accept a fluid stream from a shaker. The sample fluid line may be configured to transport the fluid stream from a sample point to the well. The sample screen may include a mesh and may be configured to process the fluid stream from the shaker. The pressure detector may be configured to obtain a fluid pressure from a fluid level within the well. The removal line may be connected to the well and configured to remove fluid from the well. The computing system may include one or more processors and a non-transitory computer-readable storage medium comprising instructions executable by the one or more processors to perform a method, the method including: obtaining the fluid stream with a pump from the shaker after a screening system has processed the fluid, wherein the screening system has at least one screen with a first mesh size; placing the fluid stream into the screen break detector, wherein the screen break detector has a sample screen with a coarser mesh than the at least one screen with the first mesh size; obtaining a first fluid pressure within the well of the screen break detector during a period when the screening system is in a first state; obtaining a second fluid pressure within the well of the screen break detector during a time period when the screening system is in the second state; in response to obtaining the first fluid pressure and the second fluid pressure, determining a differential pressure within the well of the screen break detector obtained during the period when the screening system is in the second state compared to the pressure within the well when the screening system is in during the first state; and in response to determining the differential pressure between the first fluid pressure and the second fluid pressure, transmitting a notification to an operator when the pressure within the well of the screen break detector obtained during the period when the screening system is in the second state is greater than the pressure within the well of the screen break detector during the period when the screening system is in the first state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
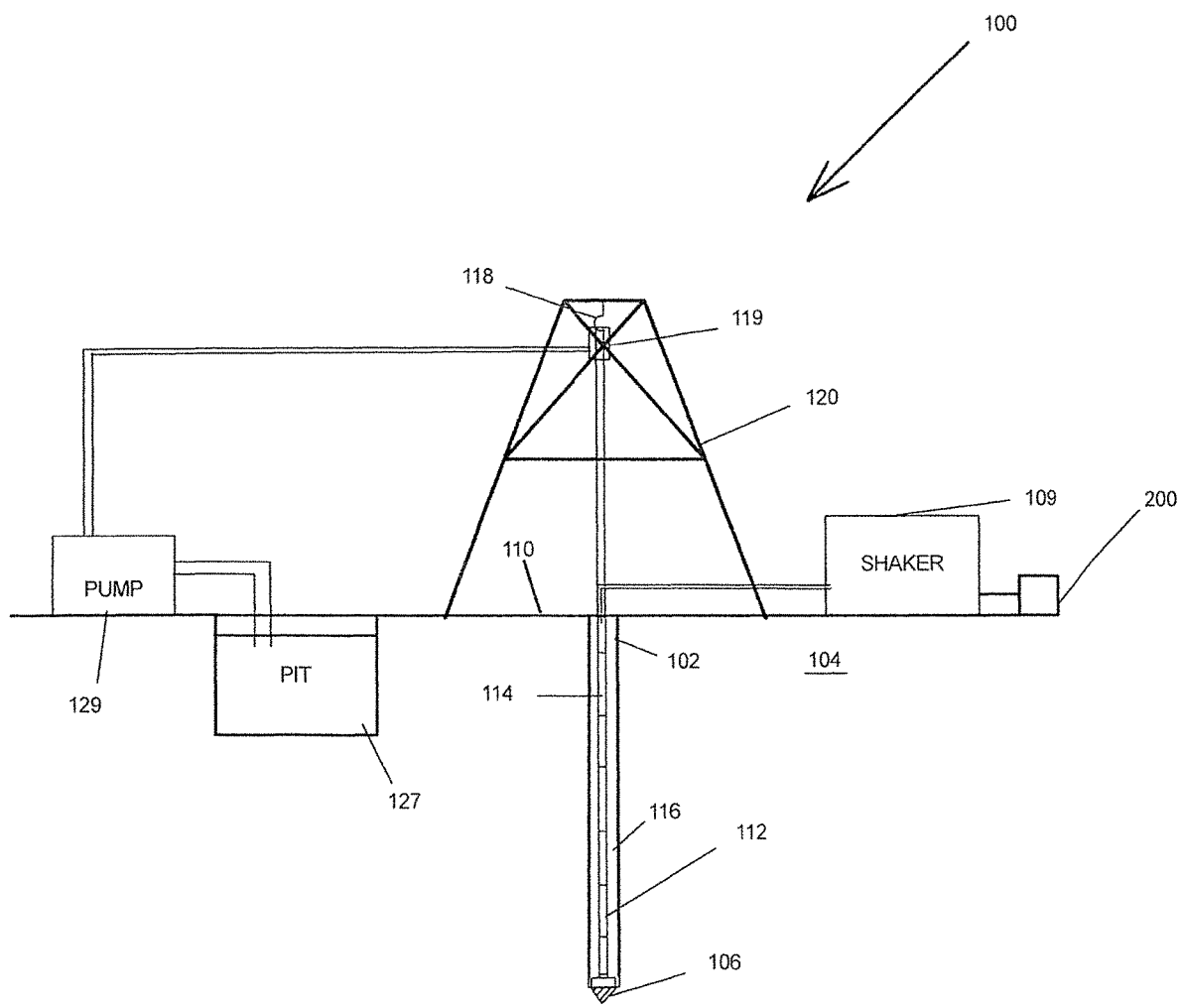
FIG. 1 is a drilling rig in accordance with one or more embodiments of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and\or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Embodiments of the disclosure relate to oil and gas drilling. Referring to FIG. 1, an example hydrocarbon drilling rig 100 is illustrated. The drilling rig 100 is positioned to create a wellbore 102 within an earth stratum 104 through actions of a drill bit 106. The drill bit 106 has a purpose of grinding materials within the earth stratum 104 such that the materials may be removed through water and/or chemicals that are pumped downhole, thereby lifting the cuttings to a surface 110. The drill bit 106 is connected to the surface 110 through a drill string 112. The drill string 112 is lengthened through continuous additions of individual sections of a drill string pipe 114. Operators may add sections of the drill string pipe 114 through mechanical arms and "make up" systems in an automated fashion or through workers that use equipment to establish a positive connection between the drill string pipe 114 and the drill string 112.

The individual sections of the drill string pipe 114 are connected to one another at joints that allow fluids to be safely conveyed to the drill bit 106 downhole. As illustrated, the drill bit 106 is configured such that the overall width of the drill bit 106 is slightly larger than the drill string 112, thus creating an annular area 116. When fluids are pumped down the drill string 112, the fluids may pass through holes provided within the drill bit 106 that allow for cooling of the face of the drill bit 106. The cuttings then pass up the annular area 116 with the pumped drilling fluid. The drilling fluid may then be cleaned and reused within the wellbore 102 for further drilling. Cleaning of the drilling fluid may be performed by placing the downhole fluid on a shaker 109 with screens and other mud cleaning systems, described later. The shaker 109 may be a single or multiple deck shaker.

Subsequent sections of pipe may be added to the drill string 112 by using a crane 118 placed on a derrick 120. A connection between the section of pipe being added and the drill string 112 is established through rotation of the section of pipe being added. Once a connection is established, the drill string 112 may be further urged into the stratum 104 until a further section of pipe is needed. The driving mechanism may be disconnected from the top of the drill string 112; a new section of pipe may be added; and rotation of the drill string 112 and the drill bit 106 may continue.

As will be understood, the wellbore 102 may be deviated from a vertical orientation. The amount of deviation may be chosen by operators in order to achieve penetration of different sections of the stratum 104. In one embodiment, the wellbore 102 may be horizontally oriented to maximize an amount of the wellbore 102 to a specific stratum 104. The directional control of the drill string 112 may be though a rotatable steering system (RSS) that may either push the drill bit 106 or point the drill bit 106 in a specific direction to achieve a desired penetration of the stratum 104.

A bottom of the drill string 112, defined as a bottom hole assembly (BHA), may have the RSS incorporated, as well as the sensors described above. Packages, such as a measure while drilling package (MWD), may use the sensors to perform needed measurements to allow operators the ability to determine if desired objectives are being met. When a MWD package is used, types of measuring devices may include a weight-on-bit measuring device, a vibration measuring device, a torque measuring device, a stick-slip measuring device, a shock measuring device, a direction measuring device and a stick slip measuring device. Other packages may log the process of drilling (LWD) during operations. The LWD may be used in a special drill collar and may be used to communicate with surface based equipment.

Drilling fluid or "mud" may be stored in a pit 127 formed at the wellsite. In a non-limiting embodiment, a pump 129 delivers the drilling fluid to a port in a swivel 119 causing the fluid to flow downwardly through the drill string 112.

In one embodiment, drilling fluid includes specialty chemicals, such as bactericides, defoamers, filtration reducers, lubricants and surfactants, used in the drilling process as well as solids that may be transported to the up-hole environment and processed through the shaker 109. Processing of the drilling fluid can occur, as illustrated, through the shaker 109 and a mud cleaner that provides for high efficiency removal of solids and preservation of fluids for the entire circulating volume. In one embodiment, hydrocyclones may be used above or prior to screening of drilling fluid.

Other apparatuses may be used in the downhole environment, including a mud turbine generator (not shown) that is powered by the flow of the drilling fluid in order to provide electrical power to downhole components. Another embodiment may use batteries (not shown) in the downhole environment, dispensing with the need for mud turbine generators.

The drill string 112 may be provided with sensors (not shown) to allow operators, located at the surface 110, the ability to gain data during the drilling process. These sensors may include temperature, pressure, oil/gas ratios and other parameters. The sensors may be directly wired to the drill string pipe 112 to convey data quickly up-hole. In one embodiment, data may be provided to the surface 110 through the use of a mud pulse telemetry system (not shown).

A screen break detector 200 is connected to the shaker 109. In another embodiment, the screen break detector 200 is a part of the shaker 109. Drilling and use of the drilling rig 100 equipment may be required for extended periods of time. Although not illustrated in FIG. 1, the drilling rig 100 may use multiple shakers 109 while maintenance occurs on individual shakers 109 during drilling operations. To this end, flow may be diverted to and from individual shakers 109 to allow operators the ability to perform maintenance activities. One such maintenance activity is changing of screens. Screens may include one or more layers of mesh having a mesh size that is sufficient to remove solid materials from a downhole flow. Screens provide for the mechanical sifting capability of the drilling fluid used in the drilling rig 100. Screens can often break or degrade during processing, which would allow oversized materials to pass through the mesh. This would result in the screen break detector 200 observing a second state. In the second state, oversized screen materials can impact vital components of the drill string 112 or the drilling rig 100 and damage those components. Aspects herein provide an apparatus and method to determine if a mesh or screen is damaged, thereby preventing operation of the drilling rig 100 without the necessary screening.

The screen break detector 200 described can be installed on a single screen, multiple screens, a single shaker 109, or a group of shakers 109 as appropriate. A primary screen system is defined as a single shaker 109 or group of shakers 109 with a single screen in use. A secondary screen system is a defined as a single shaker 109 or group of shakers 109 with multiple screens in use. In one embodiment, multiple screen break detectors 200 can be used to provide checks on specific screens or specific areas of processing that may be of concern to operators, in either the primary screen system or the secondary screen system. The screen break detector 200 may be incorporated into automated systems of the drilling rig 100 to notify operators of potentially degraded conditions. Moreover, the screen break detector 200 may be connected to other automated systems that will allow for an orderly stop to the drilling process to prevent equipment damage from occurring. In this embodiment, a stopping threshold pressure must be reached by the determination and analysis of the screen break detector 200. The screen break detector 200 may alter drilling configurations, such as diverting flow from one shaker 109 to another shaker 109, thereby allowing drilling to continue, but allowing the operators an opportunity to repair screens that may be damaged. In this embodiment, a diversion threshold pressure must be reached by the determination and analysis of the screen break detector 200. Such configurations increase the overall economic viability of the drilling rig 100 as breakdowns are minimized. The stopping threshold and the diversion threshold may be a pre-set threshold pressure.

In one embodiment, the types of shakers 109 found with the screen break detector 200 may include shakers 109 that have a hopper, a feeder, a screen basket, a basket angling mechanism and a vibrator as components thereof. As will be understood, the screen may have a frame, a mesh placed within the frame and a binding agent affixing the mesh to the frame. Although listed as including these components, shakers 109 may have some, all, or none of these components.

Figure 2:
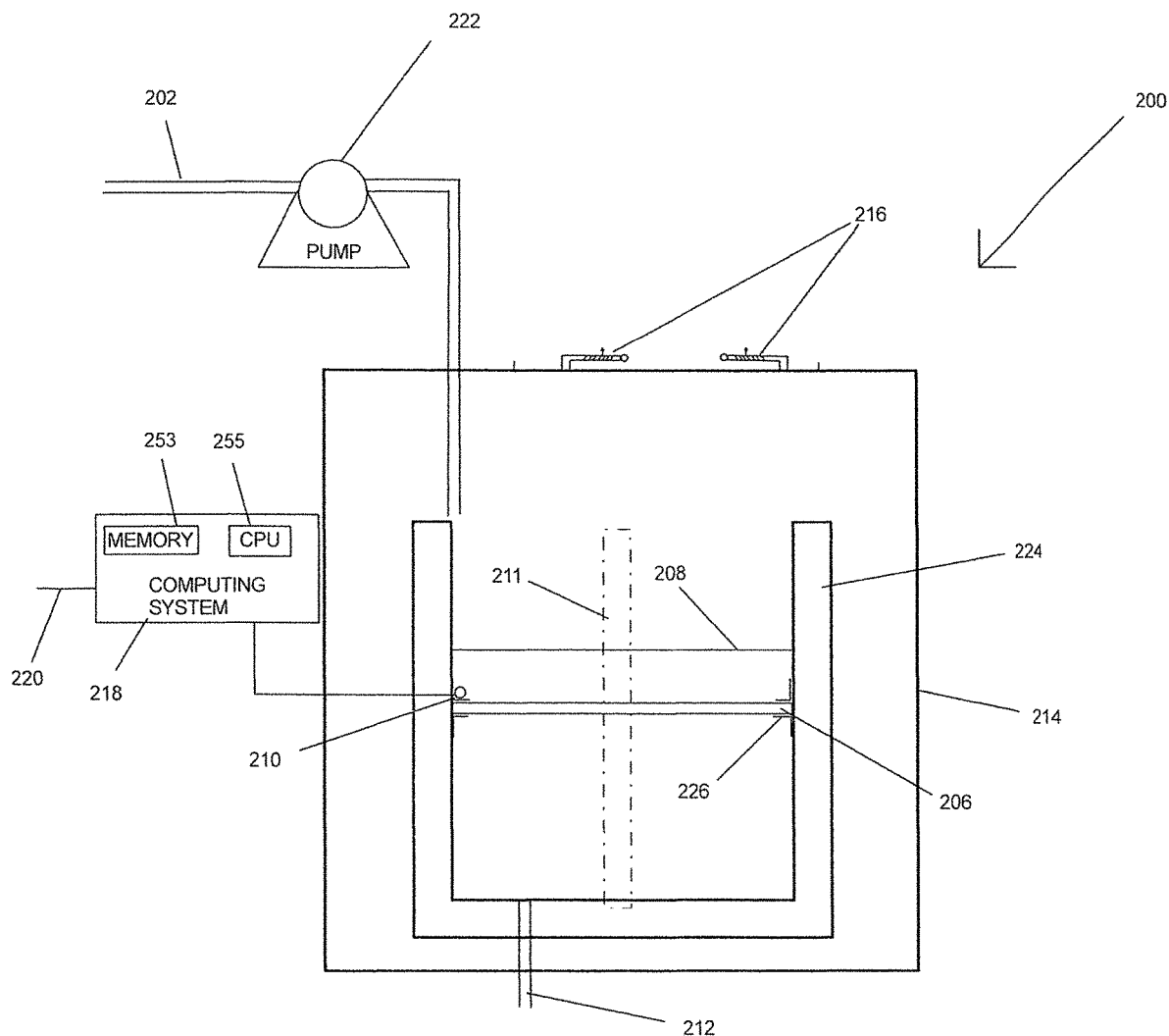
FIG. 2 is a screen break detector that may be installed on the drilling rig of FIG. 1.

Referring to FIG. 2, the screen break detector 200 obtains a fluid stream from a sample point on the drilling rig 100. The sample point may be after a specific screen, in the fluid collection portion of a skid or at another location. In one embodiment, the shaker 109 may rests upon the skid, which elevates the shaker 109 above a deck of the drilling rig 100. The skid may be comprised of I beams, W beams or other complex structural elements, and the skid rests under the shaker 109 to collect or gather the drilling fluid. In one embodiment, the sample point is located at a position "downstream" of the screen such that if oversized materials are passing through the screen, they may be incorporated into the fluid taken by the sample point. The fluid flow obtained is then processed by the screen break detector 200.

The screen break detector 200 has a sample fluid line 202 that obtains fluid from a position in the drilling rig 100 after the screening system. A pump 222 is used to transfer the fluid (and associated solids) from the sample point to the remainder of the screen break detector 200. The fluid is deposited inside a chamber 214 that houses a well 224. The well 224 has at least one screen retainer 226 that supports a sample screen 206. The sample screen 206 is removable through a hatch 216 located on a top side of the chamber 214. Fluid enters the chamber 214 at a rate determined by the pump 222. As will be understood, the faster the pump 222 transfers fluid, the more fluid that will be required to be housed within the well 224, thereby increasing the overall size of the screen break detector 200. In one embodiment, the pump 222 retrieves a sample prior to a mud cleaner (not shown) and connects to the shaker 109. Such a sample will be representative of the drilling fluid as a whole.

The pump 222 may be configured to have a variable fluid draw rate such that a higher volume of sample is taken when the drilling rig 100 is operating at maximum capacity. Such variable fluid draw can ensure that the same amount of fluid is drawn from the fluid system on a volumetric basis, whether the fluid system is operating at maximum capacity or not. Data can be stored within a computing system 218 as to the draw rate of the pump 222 for each pressure reading.

The screen break detector 200 has a fluid removal line 212 that allows fluid that has passed through the sample screen 206 to be removed from the chamber 214 and transmitted back to the overall fluid flow of the drilling rig 100. The pump 222 draws fluid from the sample point into the sample fluid line 202 at a constant rate. This constant rate of fluid entering the chamber 214 will allow fluid to be retained up to a fluid line 208 within the well 224. The sample screen 206 is created with a mesh size that is coarser or equal to the mesh size of the screens located in the shaker 109 described in FIG. 1. Under normal operations, solid materials will not accumulate within the screen break detector 200, as the solid materials will have already been filtered out in the upstream shaker 109. This is defined as a first state. However, if a break or degradation of the mesh happens within the upstream shaker 109, solids will pass through the shaker 109 and be picked up by the sample fluid line 202. This is defined as the second state. These solid materials will settle, through gravity, onto the sample screen 206, thereby blocking the holes within the mesh of the sample screen 206. Solid materials settling onto the sample screen 206 will cause a restriction in the overall flow of fluid passing out through the fluid removal line 212. The fluid line 208 will rise within the well 224. A pressure detector 210 is located within the well 224 to take pressure measurements at a specific location within the well 224. An increase in fluid height of the fluid line 208 will be identified by the pressure detector 210 as the fluid height change will result in a greater hydrostatic pressure reading at the pressure detector 210. The pressure detector 210 is connected to the computing system 218 that receives the data produced by the pressure detector 210. The computing system 218 may include a processor, such as a central processing unit (CPU); a dedicated integrated circuit, such as an application specific integrated circuit ("ASIC"); a dedicated field programmable gate array (FPGA); or other processing resource. The computing system 218 may also include a non-transitory computer-readable medium capable of storing information captured by the pressure detector 210. The CPU 255 of the non-transitory computer-readable medium executes instructions stored on the non-transitory computer-readable medium, and the non-transitory computer-readable medium may be non-volatile random-access memory (NVRAM) 253, which provides for retention of data in the case of a loss of electrical power.

In one embodiment, the pressure detector 210 may be any type of pressure measuring mechanism including, but not limited to, electro-magnetic, optical, potentiometric, piezoelectric and capacitive types.

A comparison of data obtained by the pressure detector 210 may be performed by the computing system 218. Such a comparison may allow for determining the increase or decrease of pressure measured by the pressure detector 210. A comparison may also be provided with a pre-set pressure threshold. Establishment of a pre-set threshold may allow for small increases in pressure; however, if a large enough pressure is determined by the pressure detector 210, then supplemental or auxiliary action may be performed.

The computing system 218 may allow for notification of conditions through a data line 220. The data line 220 may be connected to a visual alarm, such as a lighted button, located on the shaker 109. In one embodiment, the data line 220 may be connected to a remote location such that operators in other areas of the drilling rig 100 may be alerted. For example, the data line 220 may be connected to the drilling rig 100 operations software to terminate drilling activity if a break is identified. This would require the pressure detector 210 to be provided a pre-set stopping threshold. The stopping threshold, once reached, would automatically terminate the drilling process to prevent cascade failure of the drilling rig 100. In another embodiment, the data line 220 may feed data to a flow diverting system to allow for fluid to be diverted from a shaker 109 that exhibits a pressure reading in the second to a separate shaker 109 that exhibits a pressure reading in the first state.

A view window 211 may be provided in the side of the well 224. The view window 211 allows for optical viewing of the processing of the fluid within the well 224, so operators may identify the presence of solids within the well 224. The view window 211 may be made of an acrylic material or shatterproof material.

Figure 3:
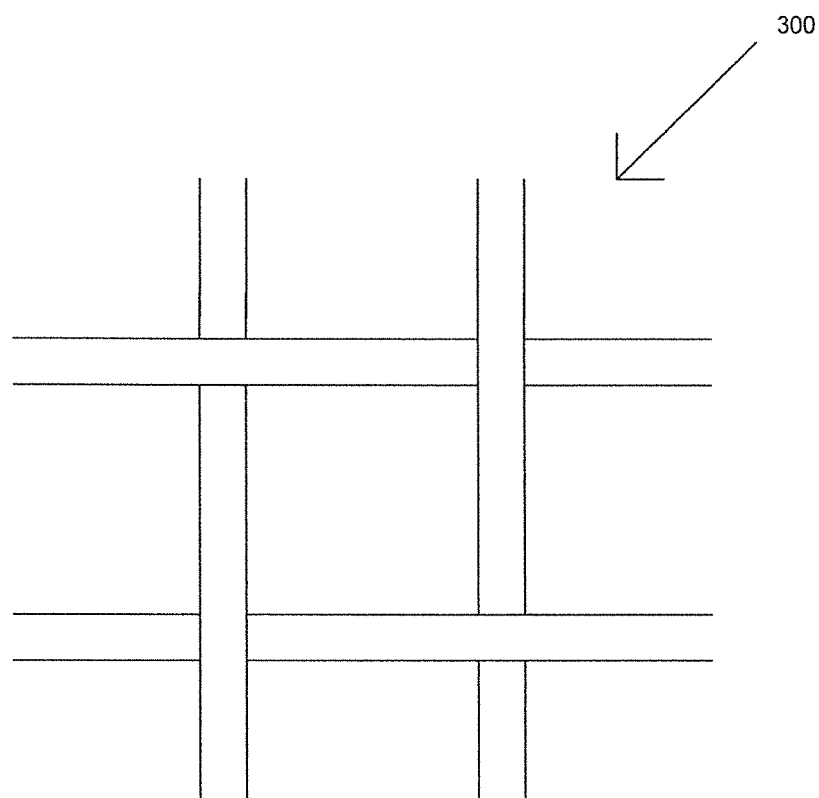
FIG. 3 is a screen mesh of the screen break detector of FIG. 2.

Referring to FIG. 3, a plan view of a mesh 300 of the sample screen 206 of FIG. 2 is illustrated. The mesh 300 is configured with a wire formation that is equivalent in diameter for both the "x" axis and "y" axis strands. The mesh 300 for the sample screen 206 is configured such that the mesh 300 size is equal to or coarser than the mesh 300 size of the shakers 109 for the drilling rig 100. With this configuration, the screening capability of the shaker 109 is equal to or superior to that of the mesh 300 within the screen break detector 200. The materials of the mesh 300 of the sample screen 206 may be of the same material provided in the screen of the shaker 109. As illustrated, the mesh 300 of the sample screen 206 has an interleaved pattern.

As described above, the screen break detector 200 is not limited to mesh sizes that are specifically square or specifically rectangular in shape. As long as the wire formation of the sample screen 206 is at least equal to or coarser than the screens located in the shaker 109, then the screen break detector 200 will function properly. As will be understood, the sample screen 206 may match the materials used in the shaker 109. The sample screen 206 that is made of a composite construction may be used within the screen break detector 200. In one embodiment, a first vibratory motion may be added to the sample screen 206. This vibratory motion may be provided by a motor with an elliptical lobe. In another embodiment, a second vibratory motion is provided to the sample screen 206.

Figure 4:
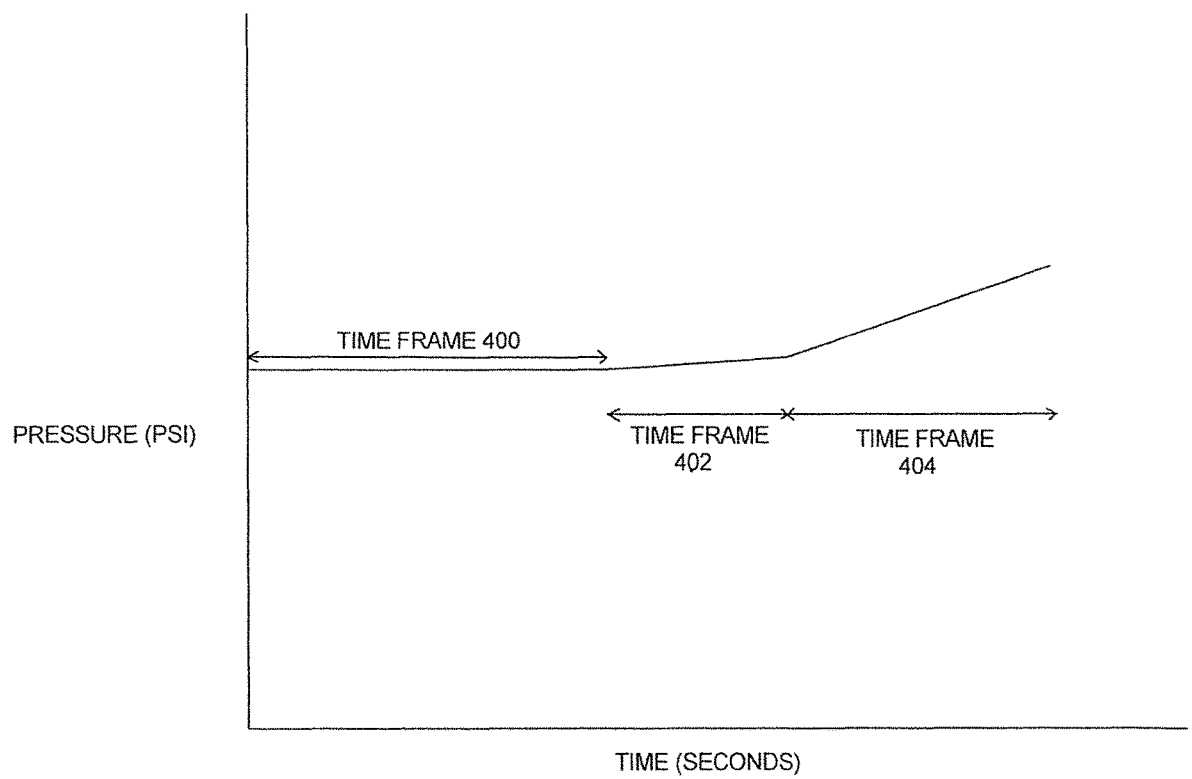
FIG. 4 is a graph of pressure build up in the screen break detector of FIG. 2.

Referring to FIG. 4, a pressure graph in the screen break detector 200 is illustrated. The "y" axis indicates pressure in pounds per square inch, or kPa, over the screen break detector 200, and the "x" axis represents time in seconds. Through a first time frame 400, the pressure is essentially stable, indicating a steady state condition. The pressure detector 210 would observe this steady state condition as the first state. In a second time frame 402, pressure has started to increase, indicating the presence of more solids in the fluid stream, and an increase in the presence of solids can indicate a presence of a broken screen. In a third time frame 404, pressure increases dramatically, indicating that the amount of solids within the fluid stream has increased due to a degraded screen allowing unwanted materials to flow through the screen. The pressure detector 210 would observe this increase in pressure as the second state. At the third time frame 404, a notification may be automatically made to operators that a presence of a screen break has been indicated by the pressure detector 210 in communication with the screen break detector 200. Auxiliary actions may also be triggered, as described below, such as stopping the drilling operations or diverting fluid flows to other screen systems that are undamaged. The diverting of fluids may be, for example, to another shaker 109 or to another bank or deck of screens, as appropriate.

Figure 5:
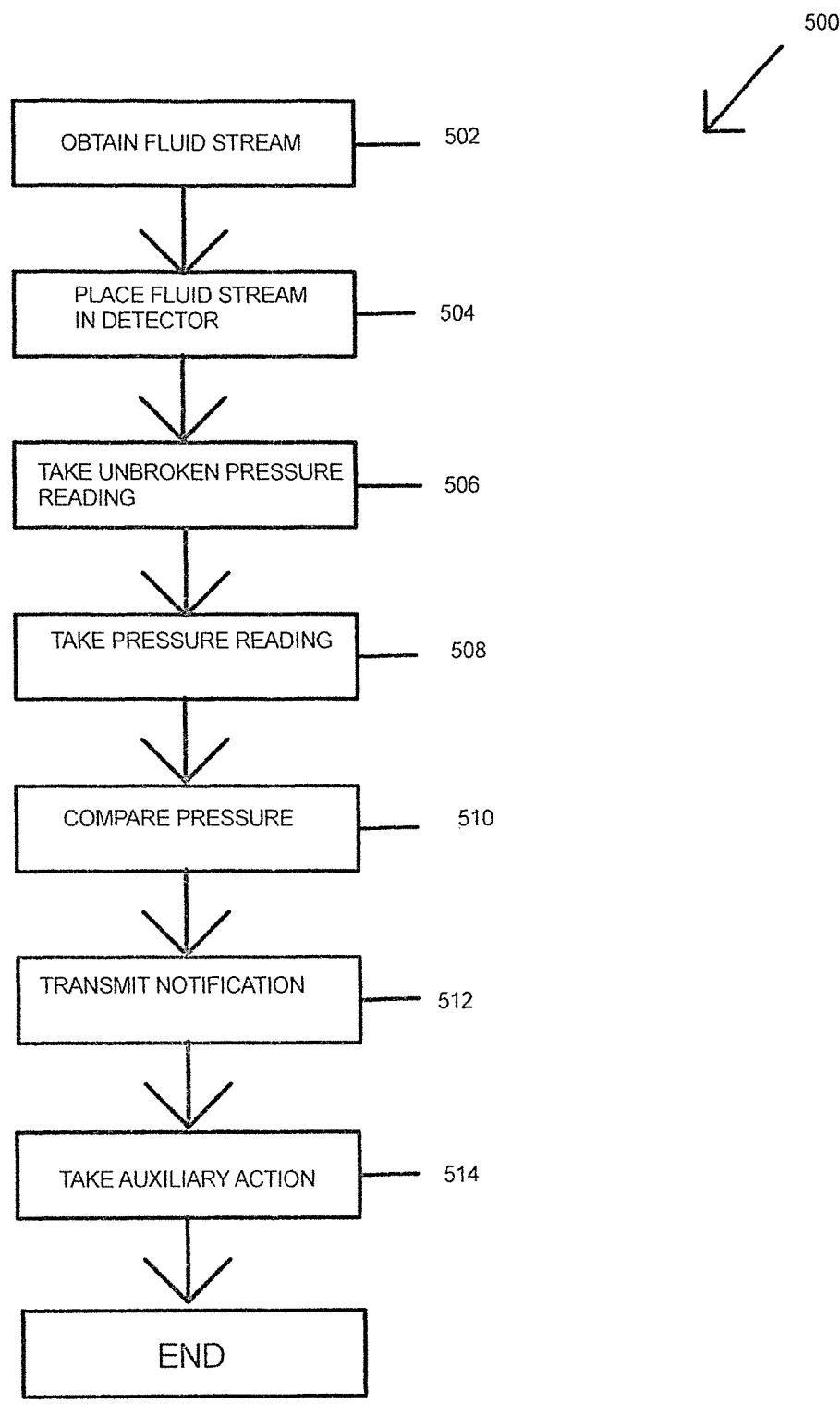
FIG. 5 is a flowchart depicting a method for determining a screen break in accordance with another embodiment of the disclosure.

Referring to FIG. 5, a method 500 for determining a screen break is illustrated. The method 500 may include, at 502, obtaining a fluid stream from a drilling process fluid system after a screening system in a drilling process, wherein the screening system has at least one screen with a first mesh size. At 504, the method continues by placing the fluid stream into a screen break detector, wherein the screen break detector is configured with a sample screen with at least equal to or coarser mesh than the at least one screen with the first mesh size. At 506, the method continues by obtaining a pressure within the screen break detector during a period when the screening system is in a first state. At 508, the method continues by obtaining a pressure within the screen break detector during the period when the screening system is in a second state. At 510, the method may continue by determining the difference in pressure between the screen break detector obtained during the period when the screening system is in the second state to the pressure during the period when the screening system is in the first state to obtain a differential pressure. At 512, the method continues by transmitting a notification to an operator when the differential pressure between the screen break detector obtained during the period when the screening system is in the second state is greater than the pressure within the screen break detector during the period when the screening system is in the first state. At 514, an auxiliary action may be performed after the notification. The auxiliary action may include stopping the drilling process when comparing the pressure within the screen break detector obtained during the period when the screening arrangement is in the second state to the pressure when the screen break detector is during the period when the screening arrangement is in the first state to obtain a differential pressure that is greater than a stopping threshold. The stopping threshold is defined as a pre-determined pressure drop level that could be based on multiple factors, such as the size of the mesh, the size of the screen, the flow through the screen and other wet chemistry methods that may affect the information captured by the pressure sensor. Generally, the stopping threshold will be used on a drilling rig that employs at least one shaker; and once the stopping threshold is reached, then the drilling process will automatically shut down. Such an action would prevent a cascading process of equipment failures of the drilling operations that may be the result from having a solids content within the drilling fluids outside of specifications.

In one embodiment, the auxiliary action may include diverting the process flow stream away from the screening system when comparing the pressure within the screen break detector obtained during the period when the screening system is in the second state to the pressure when the screen break detector is at during the period when the screening system is in the first state to obtain a differential pressure is greater than a diversion threshold. The diversion threshold is defined as a pre-determined pressure drop level that could be based on multiple factors, such as the size of the mesh, the size of the screen, the flow through the screen and other wet chemistry methods that may affect the information captured by the pressure sensor. Generally, the diversion threshold will be used on a drilling rig that employs at least two shakers; and once the diversion threshold is reached, then the drilling process will automatically divert flow from at least one shaker to at least one other shaker. Such an action allows for diversion of flow to at least one other shaker, and also allows operators the time to fix or replace screens that are damaged while not impacting overall drilling efficiency.

As will be understood, a drilling operation can employ the stopping threshold and the diversion threshold, depending on the number shakers being used by the drilling rig. A drilling operation that has more than one shaker in use can reach the diversion threshold to employ another shaker, but if the flow pressure remains too large, then the stopping threshold will be reached and prevent cascade failure of the drilling rig by automatically ceasing the drilling operation.

As will be understood, the obtaining of a fluid stream, including solids, may be performed at various locations including directly after a specific screen, such as a primary screen system, or after a group of screens, such as a secondary screen system. In another embodiment, obtaining the fluid stream may be performed by a series of shakers. As will be further understood, numerous screen break detectors may be used, so a granularity may be obtained to allow operators to pinpoint an upstream area that is most likely causing a solids increase. Screens may be layered in "decks". To this end, each screen break detector may be sized according to the screen that provides the fluid. Therefore, if a screen system has a top deck with a mesh size of 0.25 inches (0.635 centimeters), then the corresponding mesh size of the screen break detector may be 0.25 inches (0.635 centimeters) or larger. If a middle deck screen has a mesh size of 0.2 inches (0.508 centimeters), then the corresponding mesh size of the screen break detector for the middle deck may be 0.2 inches (0.508 centimeters).

If applicable, the stopping threshold and the diversion threshold may be decreased if equipment failure occurs due to solids loading. However in one embodiment, the stopping threshold and the diversion threshold may be increased if equipment failure is not seen, and evaluations indicate that the geological features are less constrictive than originally hypothesized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method, comprising:
   receiving a fluid stream from a screen system of a fluid system into a screen break detector, wherein the screen system comprises at least one screen, the screen break sensor comprises a sample screen, and the fluid system comprises a hydrocarbon system coupled to a wellbore;

monitoring, via sensor data received by a processor, a fluid pressure of the fluid stream flowing through the sample screen of the screen break detector;

detecting, via analysis of the sensor data by the processor, a condition of the at least one screen of the screen system based on the fluid pressure and one or more pressure thresholds; outputting, via the processor, a notification of the condition of the at least one screen of the screen system; and changing a fluid flow in the fluid system in response to detection of the condition of the at least one screen of the screen system.

2. The method of claim 1, wherein changing the fluid flow comprises stopping the fluid flow, diverting the fluid flow, or a combination thereof, wherein the one or more pressure thresholds comprise a diversion threshold, a stopping threshold, or a combination thereof.

3. The method of claim 1, wherein the screen system comprises a shaker having the at least one screen.

4. The method of claim 1, wherein the hydrocarbon system comprises a drilling rig, and the fluid stream comprises a drilling fluid including drill cuttings or solid materials.

5. The method of claim 1, wherein the condition comprises a degraded condition or a screen break of the at least one screen of the screen system.

6. The method of claim 1, wherein the notification comprises a visual alarm or an audible alarm.

7. The method of claim 1, further comprising determining a differential pressure between a first value of the fluid pressure when the screen system is operating in a first state and a second value of the fluid pressure when the screen system is operating in a second state.

8. The method of claim 7, wherein the first state comprises a steady state of the fluid pressure over a first time frame, and the second state comprises an increase of the fluid pressure over a second time frame.

9. The method of claim 1, wherein monitoring the fluid pressure comprises monitoring a change in the fluid pressure over a time frame.

10. The method of claim 1, wherein the at least one screen has a first mesh size, the sample screen has a second mesh size, and the second mesh size is coarser than the first mesh size.

11. The method of claim 1, wherein the screen break detector comprises a fluid chamber, the sample screen disposed in the fluid chamber, a pressure detector fluidly coupled to the fluid chamber, a fluid sample line fluidly coupled to the fluid chamber on a first side of the sample screen, and a fluid removal line fluidly coupled to the fluid chamber on an opposite second side of the sample screen.

12. A system, comprising:
a screen break detector, comprising:
a sample screen configured to receive a fluid stream from a screen system of a fluid system, wherein the screen system comprises at least one screen, and the fluid system comprises a hydrocarbon system coupled to a wellbore;
a pressure detector configured to monitor a fluid pressure of the fluid stream flowing through the sample screen;
a computing system having a processor and memory, wherein the computing system is configured to detect a condition of the at least one screen of the screen system based on the fluid pressure and one or more pressure thresholds; and
the computing system is configured to change a fluid flow in the fluid system in response to detection of the condition of the at least one screen of the screen system.

13. The system of claim 12, wherein the computing system is configured to output a notification of the condition of the at least one screen of the screen system.

14. The system of claim 12, wherein the condition comprises a degraded condition or a screen break of the at least one screen of the screen system.

15. The system of claim 12, wherein the screen system further comprises a shaker with the at least one screen.

16. A system, comprising:
a computing system comprising one or more processors and a non-transitory computer-readable storage medium comprising instructions executable by the one or more processors to:
monitor a fluid pressure of a fluid stream flowing through a sample screen of a screen break detector, wherein the fluid stream is received from a screen system of a fluid system, the screen system comprises at least one screen, and the fluid system comprises a hydrocarbon system coupled to a wellbore;
detect a condition of the at least one screen of the screen system based on the fluid pressure and one or more pressure thresholds; and
change a fluid flow in the fluid system in response to detection of the condition of the at least one screen of the screen system.

17. The system of claim 16, wherein the instructions are executable by the one or more processors to: output a notification of the condition of the at least one screen of the screen system.

18. The system of claim 16, wherein the condition comprises a degraded condition or a screen break of the at least one screen of the screen system.

* * * * *